United States Patent
Westgate (10) Patent No.: US 6,896,229 B1
(45) Date of Patent: May 24, 2005

(54) HANGER

(76) Inventor: Larry D. Westgate, 64700 M 40, Jones, MI (US) 49061

(*) Notice: Subject to any disclaimer, the term of this patent is extended or adjusted under 35 U.S.C. 154(b) by 0 days.

(21) Appl. No.: 10/348,588

(22) Filed: Jan. 21, 2003

Related U.S. Application Data (60) Provisional application No. 60/350,989, filed on Jan. 23, 2002.

(51) Int. Cl.[7] .............................................. A47B 96/06
(52) U.S. Cl. ............................. 248/218.4; 248/219.1; 248/219.3; 248/219.4
(58) Field of Search .......................... 248/218.4, 247, 248/550, 314, 235, 219.1, 219.2, 219.3, 219.4, 248/250; 108/152; 256/65.03, 65.04, 65.05, 256/65.06; 182/187, 120, 121, 122, 92

(56) References Cited

U.S. PATENT DOCUMENTS

| | | | | |
|---|---|---|---|---|
| 194,724 A | * | 8/1877 | Greenlee | 256/24 |
| 859,239 A | * | 7/1907 | McFall | 256/57 |
| 2,414,078 A | * | 1/1947 | Wetzel | 182/188 |
| 2,721,719 A | * | 10/1955 | Giese | 248/219.4 |
| 2,844,022 A | * | 7/1958 | Klem | 54/592.5 |
| 3,342,457 A | * | 9/1967 | Bobrowski | 52/592.5 |
| 3,627,362 A | * | 12/1971 | Brenneman | 52/592.5 |
| 4,600,081 A | * | 7/1986 | Wade | 182/187 |
| 4,667,935 A | * | 5/1987 | Moore | 256/22 |
| 4,989,821 A | * | 2/1991 | Wong | 248/529 |
| 5,215,290 A | * | 6/1993 | Khalessi | 256/19 |
| 6,557,831 B2 | * | 5/2003 | Erwin | 256/65.04 |

* cited by examiner

Primary Examiner—Kimberly Wood (57) ABSTRACT

In this invention a hanger is used for attaching cross members to a vertical support structure. The hanger is made up of a box part that includes a mounting surface, two spaced distal openings and a central opening that is located between the two distal openings. The distal openings have been adapted to accommodate a fastening device. The central opening is designed to accommodate a cross member. When in use, the mounting surface of the hanger is placed against a vertical support structure and secured into position using the fastening devices. Once two hangers have been secured, a cross member is slid into and through the central openings of the two hangers, being supported by the hangers. The cross members can then provide a base onto which a platform may be assembled for such uses as hunting, camping, or other outdoor activities.

4 Claims, 9 Drawing Sheets

HANGER

CROSS-REFERENCE TO RELATED APPLICATION

This is a continuation of provisional application Ser. No. 60/350,989, filed Jan. 23, 2002.

SUMMARY OF THE INVENTION

This invention relates to a hanger used for attachment to a vertical support structure and will have particular application to a hanger used for attaching cross members to a vertical support structure.

In this invention a hanger is used for attaching cross members to a vertical support structure. The hanger is made up of a box part that includes a mounting surface, two spaced distal openings and a central opening that is located between the two distal openings. The distal openings are used to accommodate fastening devices such as straps or screws. The central opening is designed to accommodate a cross member. When in use, the mounting surface of the hanger is placed against the vertical support structure and secured into position using the fastening devices. Once two hangers have been secured to their respective support structures, a cross member is slid into and through the central openings of the two hangers with the cross member being supported by the support structure attached hangers. The cross member can then provide a base onto which a platform may be assembled for such uses as hunting, camping, or other outdoor activities.

Therefore it is an object of this invention to provide a device for attaching rail members to vertical supports.

Another object of this invention is to provide a hanger device which can be used to support a platform or a gate lock.

DESCRIPTION OF THE PREFERRED EMBODIMENTS

The preferred embodiments illustrated are not intended to be exhaustive or to limit the invention to the precise forms herein described but rather they are described in order to enable one having ordinary skill in the art to produce and use the invention.

This invention relates to a hangers 5 used for attaching a cross member 16 to vertical support structures 21. Each hanger 5 is formed into a box part 8, having a bottom mounting surface 17, a top surface 4, tapered sides 3, transverse protrusions 11 which extend from surface 17, two outer openings 9, and a central opening 7. Box part 8 is molded out of glass filled nylon and is trapezoidal in shape. Transverse protrusions 11 extend across the bottom mounting surface 17 and serve as grips. The two spaced outer openings 9 are located along the bottom mounting surface 17 of box part 8 and are adapted to accommodate fasteners 19, such as straps or belts. The central opening 7 is situated in between the two outer openings 9. The central opening 7 is large enough to accommodate a cross member 16, such as a rail or beam.

The hangers 5, when used in conjunction with vertical supports 21 and fasteners 19, are used to support and retain cross member 16. The bottom mounting surface 17 of hanger 5 is first placed against a vertical support 21, such as a tree 23 or post 24. The hanger 5 is secured into place onto the tree 23 using two fasteners 19, such as the straps shown. The straps are threaded through outer openings 9 and secured about the trees. Once secured, the transverse protrusions 11 located on the bottom mounting surface 17 of each hanger 5 will prevent the hanger from moving vertically along the tree. After two hangers 5 have been secured, a cross member 16, such as a rail or beam, is slid into and through the central openings 7 of the hangers. This not only retains the rail, but when used in conjunction with another rail supported by hangers 5 secured to two other trees, serves to provide a base upon which a platform 22 may be assembled. This platform 22 can be simply assembled by laying and securing a flooring material 27, such as wood planking over the rails.

For a second embodiment of this invention, the hanger 5 is of modified form to include holes 26 located in the tapered sides 3 and through lower mounting surface 17. This allows the hanger 5 to be secured into place onto a tree 23 or post 24 using screws 25 as the fastening devices. Holes 26 are used similarly to outer openings 9 for accepting a fastening device. Once secured, the hangers 5 function in the same manner as mentioned above, supporting cross members 16 and overlying planking 27.

Figure 1:
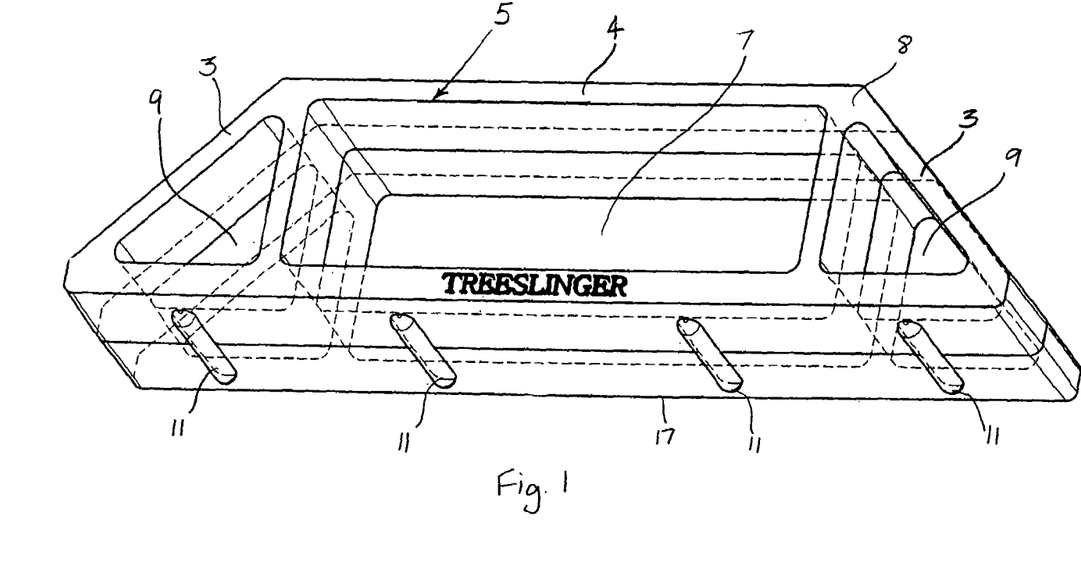
FIG. 1 is a perspective view of the hanger of this invention.
Figure 2:
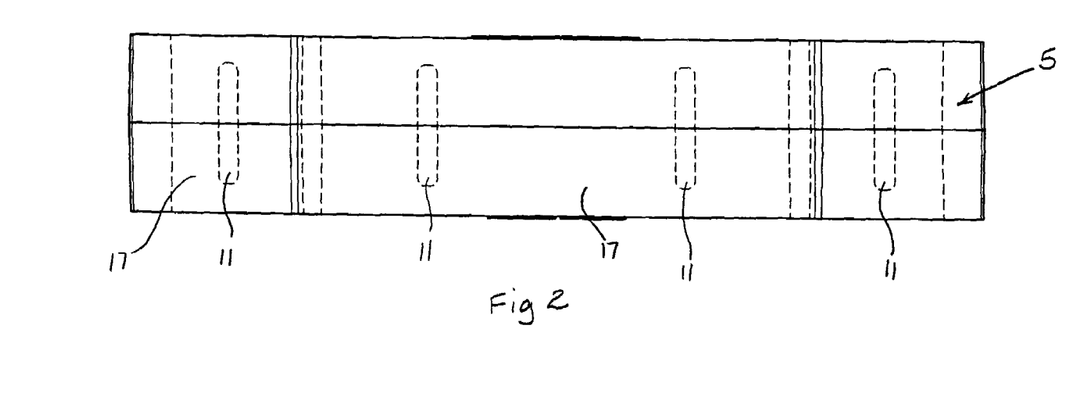
FIG. 2 is a bottom view of the hanger.
Figure 3:
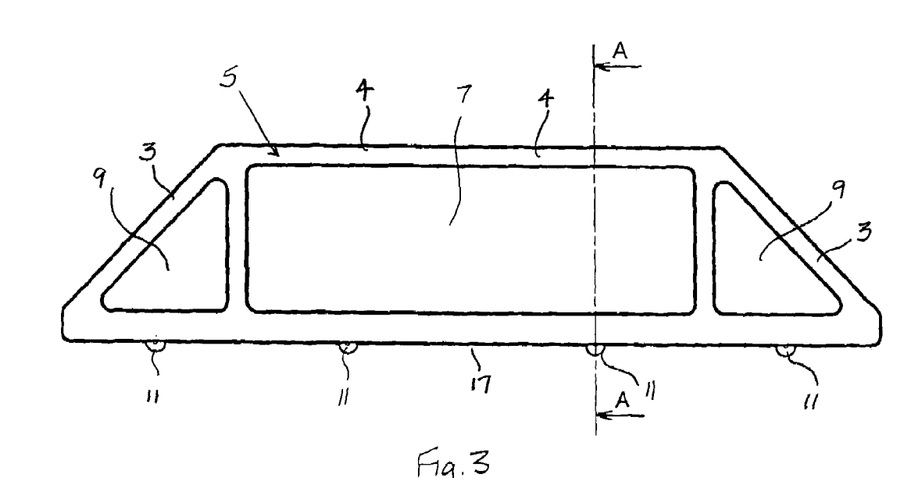
FIG. 3 is a side view of the hanger.
Figure 4:
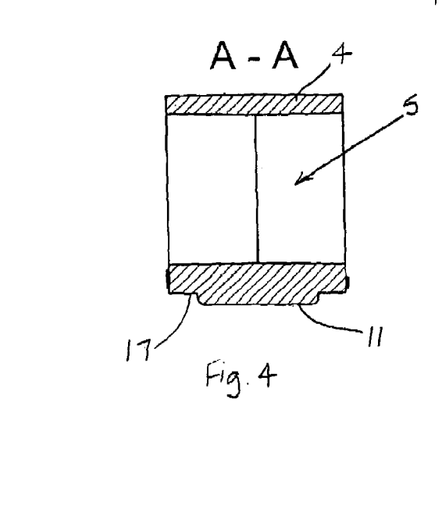
FIG. 4 is a cross-sectional view taken along line A—A of FIG. 3.
Figure 5:
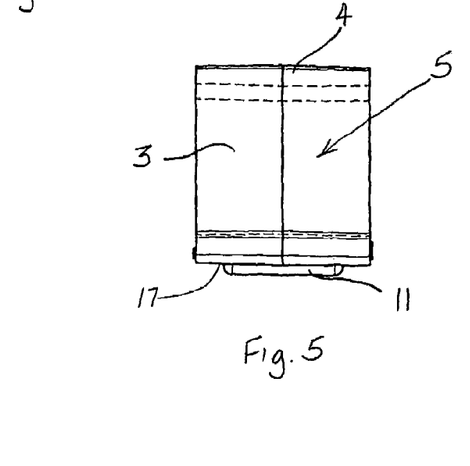
FIG. 5 is an end view of the hanger.
Figure 6:
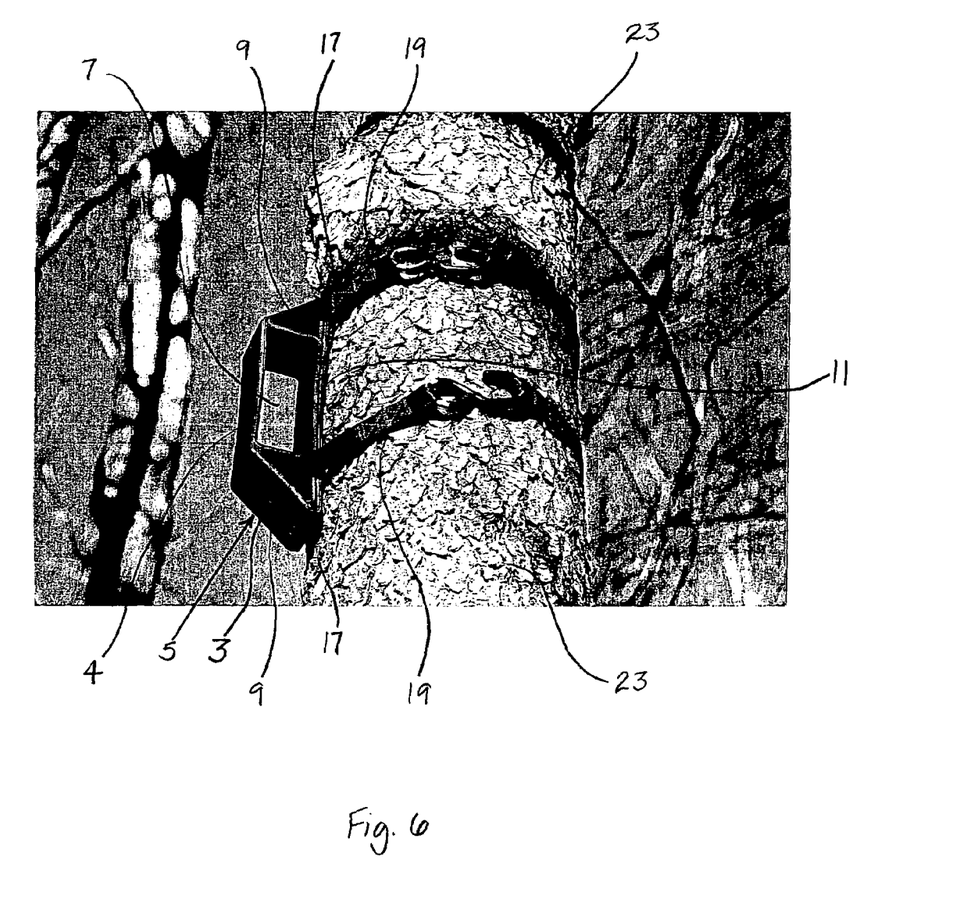
FIG. 6 is a perspective view of the hanger illustrating the placement of the fastening straps through the outer openings of the hanger.
Figure 7:
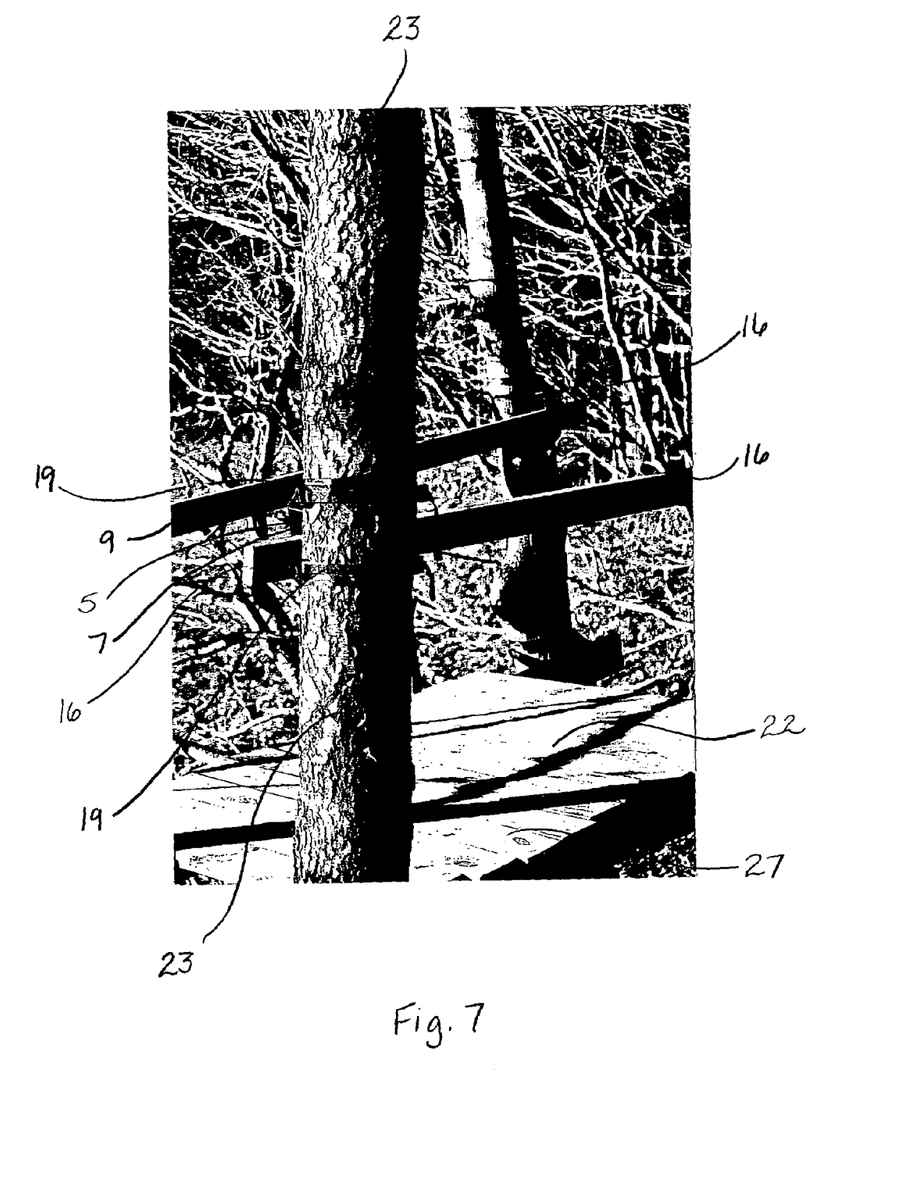
FIG. 7 is a perspective view illustrating the placement of a guard rail through the central openings of the hangers above the platform.
Figure 8:
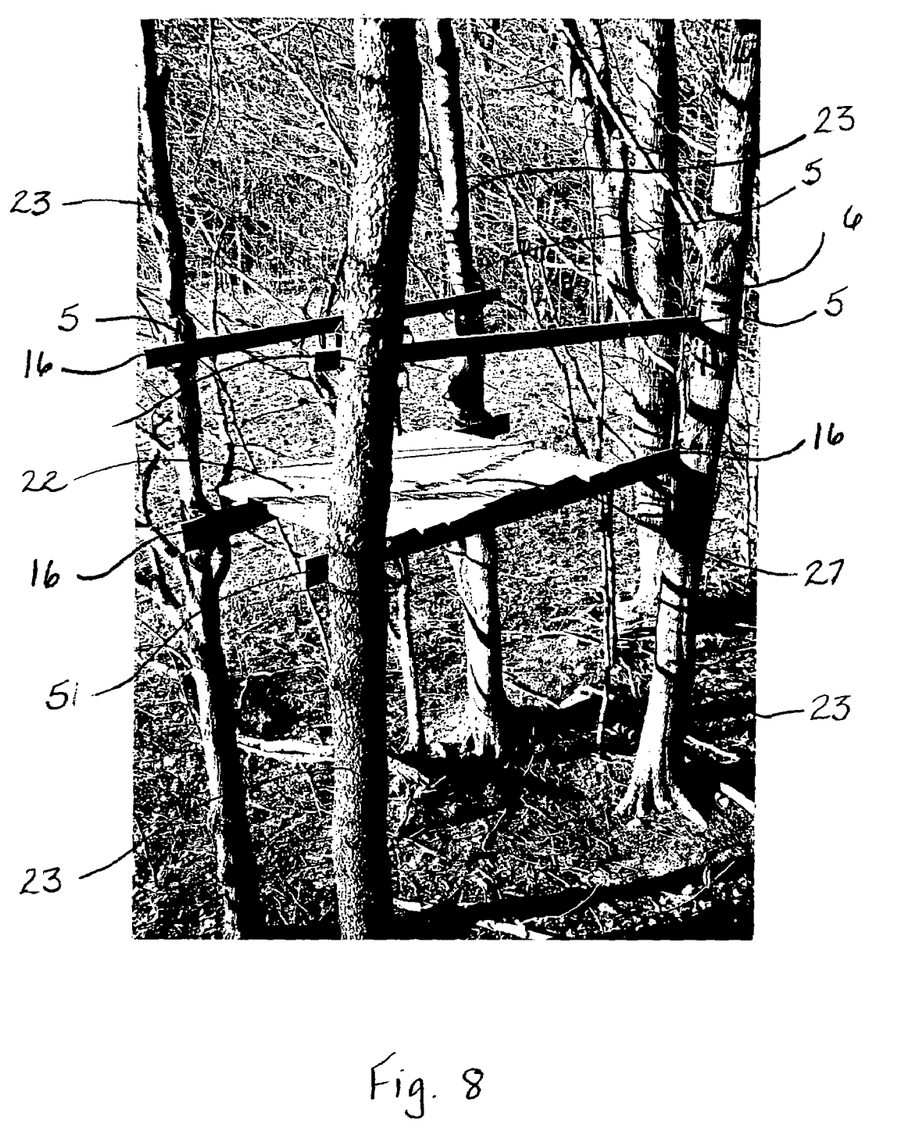
FIG. 8 is a perspective view of the platform structure as seen from below.
Figure 9:
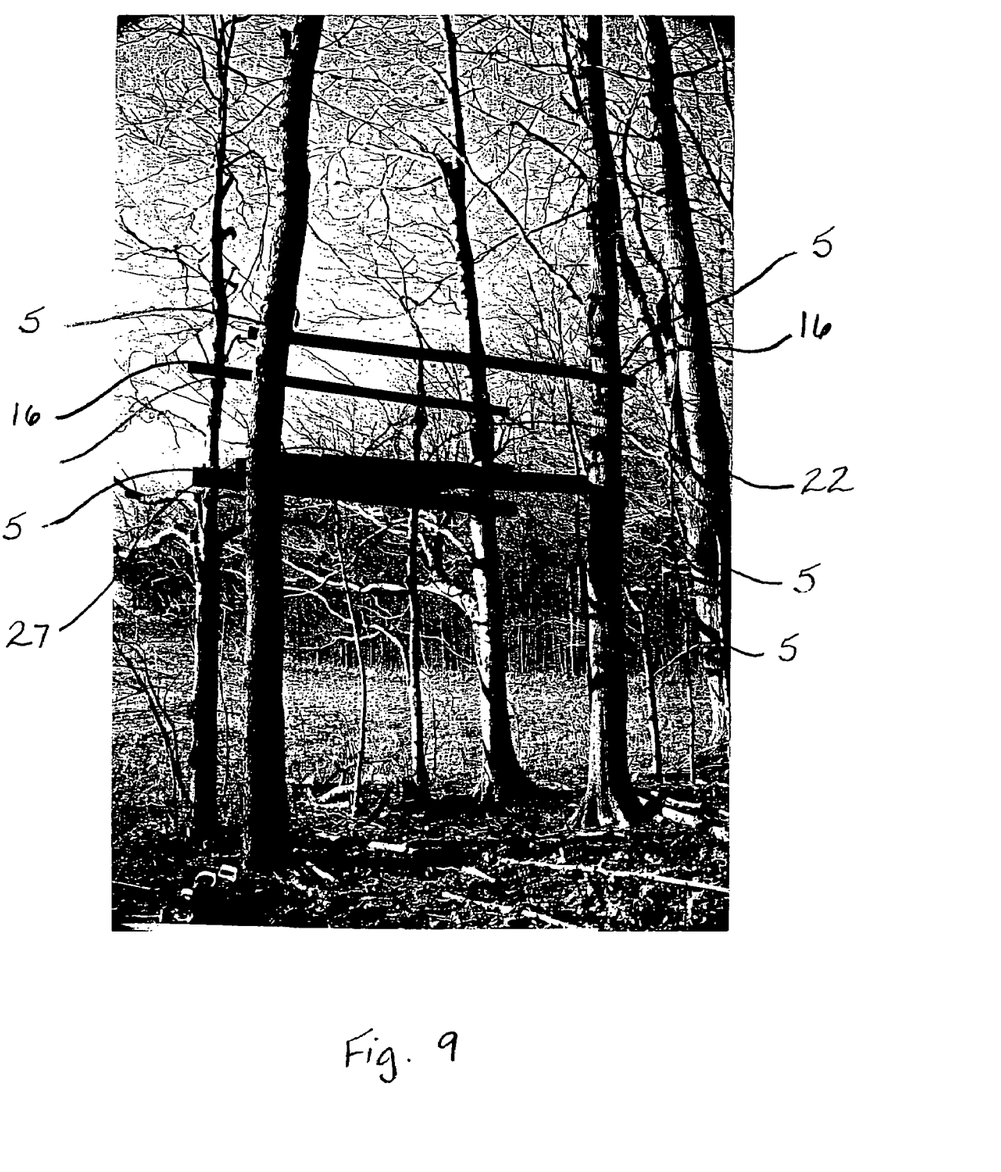
FIG. 9 is a perspective view of the platform structure as seen from above.
Figure 10:
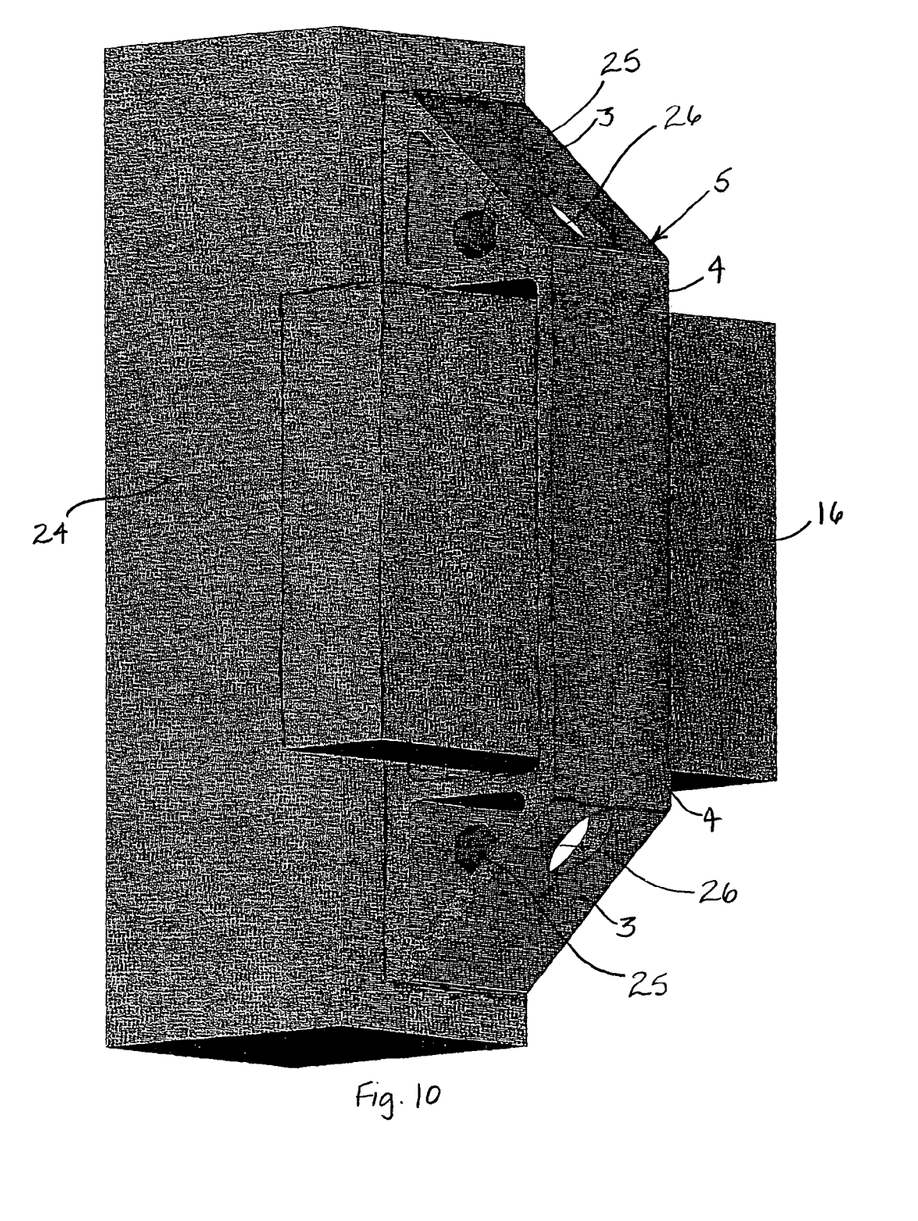
FIG. 10 is a perspective view of the second embodiment of the hanger of this invention.
Figure 11:
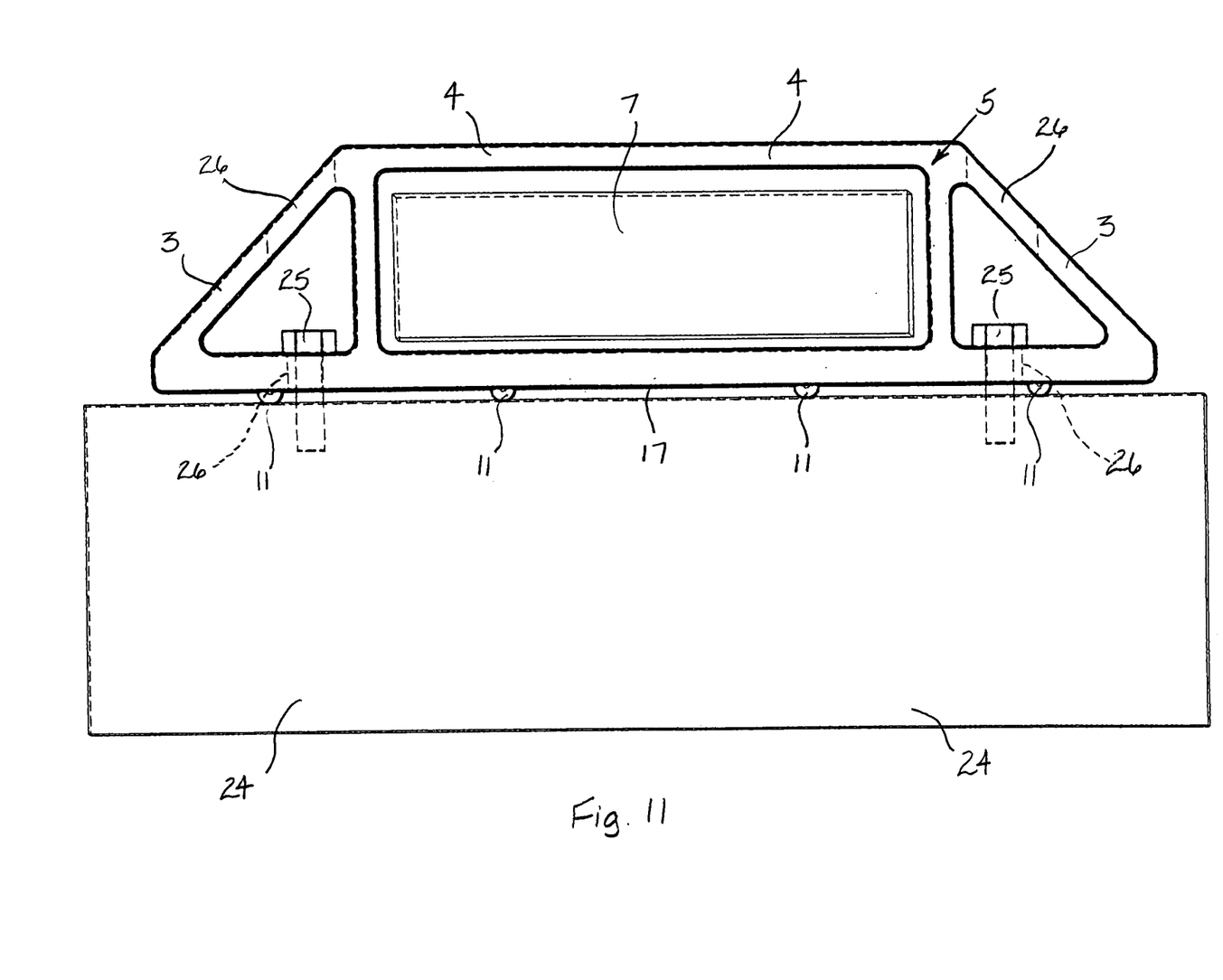
FIG. 11 is a side view of the second embodiment of the hanger secured to the vertical support using screws as fastening devices.
Figure 12:
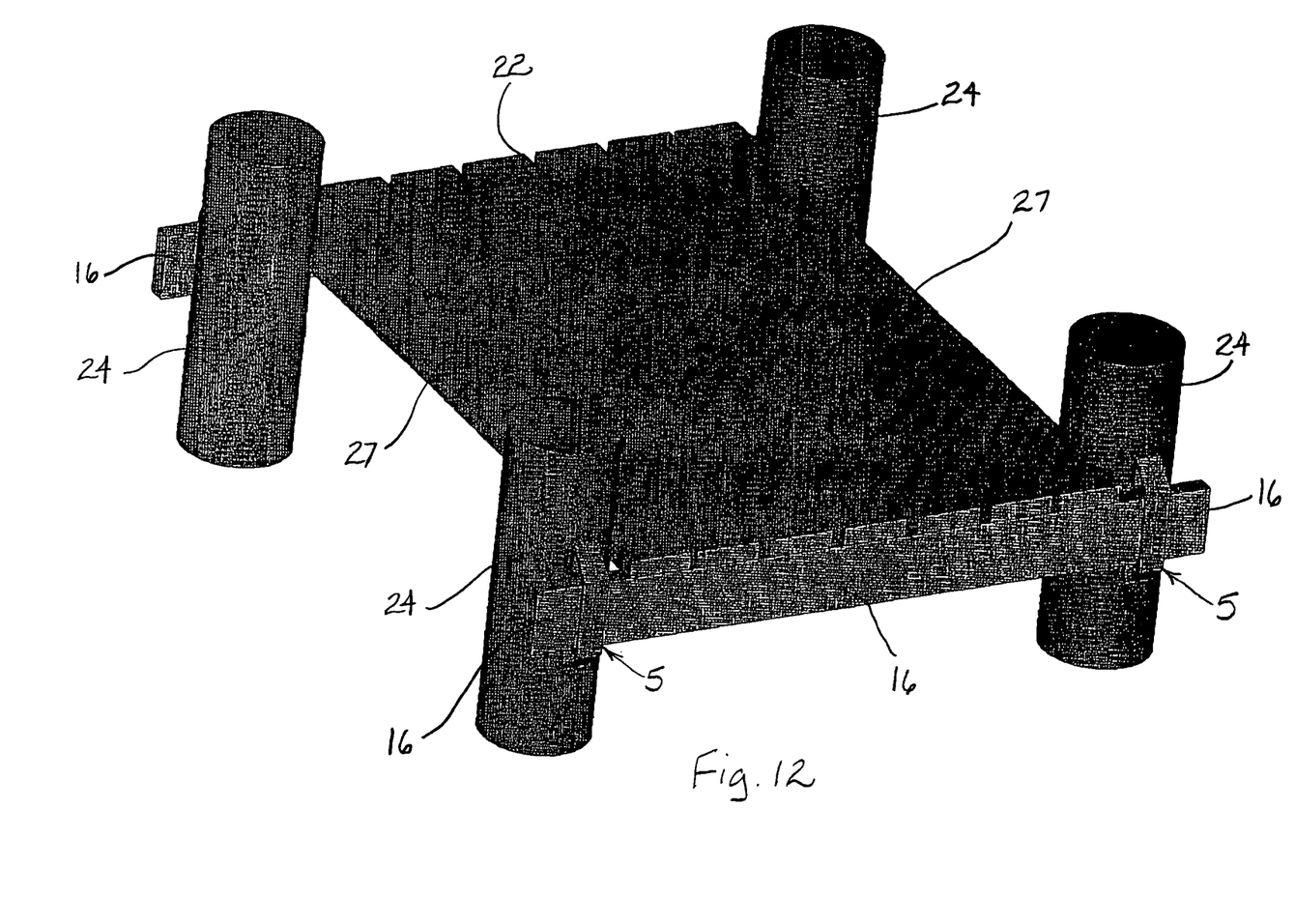
FIG. 12 is a perspective view of the second embodiment showing a platform structure.

Outer openings 9 shown in FIGS. 1 and 3, and holes 26 shown in FIGS. 10 and 11, serve as distal openings to accommodate fastening devices.

I claim:

1. A support assembly comprising spaced vertical supports, a first hanger and a second hanger carried by said supports, and a horizontal cross member carried by said hangers; each hanger including a box part having a mounting surface along an exterior side of said box part, two spaced distal openings, and a central opening located between said distal openings, each of said openings located opposite said mounting surface with said central opening oriented parallel to said mounting surface; said first hanger abutting one of said supports at its said mounting surface; said second hanger abutting another of said supports at its said mounting surface; a fastener within a said distal opening in each hanger securing the hanger to its abutted support;

said cross member extending between said hangers and having its one end fitted into said central opening of said first hanger and its opposite end fitted into said central opening of said second hanger.

2. The support device of claim 1 wherein each of said openings are oriented parallel to said mounting surface.

3. A hanger for attachment to a vertical support, said hanger comprising: an enclosed frame having an inner surface, an outer surface, an upper cross brace, and a lower cross brace; the outer surface of said frame defining a vertical mounting surface for abutting said vertical support; said inner surface of said frame and said cross braces defining a pair of distal openings and a central opening located between said distal openings; each of said openings oriented transverse to said frame; each of said openings located opposite said mounting surface; said distal openings adapted to receive a fastener therethrough for securing said hanger to said support with said mounting surface abutting said support; said lower cross brace adapted to carry a horizontal cross member within said central opening transverse to said frame.

4. The hanger of claim 2 and; a plurality of transverse protrusions along said mounting surface for gripping said vertical support.

* * * * *